(12) United States Patent
Warchola (10) Patent No.: US 9,205,788 B2
(45) Date of Patent: Dec. 8, 2015

(54) VEHICLE TO SNOW/ICE CONTROL DEVICE WIRING HARNESS WITH REPLACEABLE CONNECTOR

(71) Applicant: Meyer Products, LLC, Clevleand, OH (US)

(72) Inventor: Martin Warchola, Medina, OH (US)

(73) Assignee: Meyer Products, LLC, Cleveland, OH (US)

( * ) Notice: Subject to any disclaimer, the term of this patent is extended or adjusted under 35 U.S.C. 154(b) by 80 days.

(21) Appl. No.: 14/161,062

(22) Filed: Jan. 22, 2014

(65) Prior Publication Data
US 2014/0206205 A1 Jul. 24, 2014

Related U.S. Application Data

(60) Provisional application No. 61/755,271, filed on Jan. 22, 2013.

(51) Int. Cl.
| | |
|---|---|
| *H01R 13/44* | (2006.01) |
| *B60R 16/02* | (2006.01) |
| *H01R 31/02* | (2006.01) |
| *H01R 13/52* | (2006.01) |
| *H01R 13/622* | (2006.01) |
| *H01R 107/00* | (2006.01) |

(52) U.S. Cl.
CPC ............ *B60R 16/0215* (2013.01); *H01R 31/02* (2013.01); *H01R 13/5202* (2013.01); *H01R 13/622* (2013.01); *H01R 2107/00* (2013.01); *H01R 2201/26* (2013.01); *Y10T 29/49174* (2015.01); *Y10T 29/53213* (2015.01)

(58) Field of Classification Search
CPC ............. H01R 2201/26; H01R 13/447; H01R 13/562; H01R 31/06; H01R 33/92; B60D 1/62; B61G 5/10
USPC .............. 439/34, 35, 142, 445, 503, 638, 639
See application file for complete search history.

(56) References Cited

U.S. PATENT DOCUMENTS

| | | |
|---|---|---|
| 4,279,084 A | 7/1981 | Low et al. |
| 4,280,062 A | 7/1981 | Miller et al. |
| 4,846,697 A * | 7/1989 | Rodgers .......................... 439/35 |
| 5,800,188 A * | 9/1998 | Barber et al. ................. 439/142 |
| 6,005,300 A | 12/1999 | Kelly |
| 6,138,388 A | 10/2000 | Kost et al. |
| 6,256,909 B1 | 7/2001 | Kost et al. |
| 6,273,729 B1 | 8/2001 | Kelly |
| 6,323,759 B1 | 11/2001 | Menze |

(Continued)

OTHER PUBLICATIONS

Preliminary Report on Patentability for International Application No. PCT/US2014/012486, Apr. 20, 2015.

(Continued)

*Primary Examiner* — Thanh Tam Le
(74) *Attorney, Agent, or Firm* — Roger D. Emerson; Timothy D. Bennett; Emerson Thomson Bennett (57) ABSTRACT

A first electrical wiring harness may be connectable to a vehicle and a second electrical wiring harness may be connectable to a snow/ice control device. A replaceable connector may be used between the first and second wiring harnesses so that it is easy to connect the wiring harnesses to each other and thereby electrically connect the snow/ice control device to the vehicle.

20 Claims, 10 Drawing Sheets

(56) References Cited

U.S. PATENT DOCUMENTS

| | | | |
|---|---|---|---|
| 6,695,621 B1* | 2/2004 | Wang | 439/35 |
| 6,749,438 B1* | 6/2004 | Scheller et al. | 439/35 |
| 8,932,065 B2* | 1/2015 | Gerling | 439/35 |
| 2004/0053525 A1 | 3/2004 | Matsuo et al. | |
| 2008/0073090 A1 | 3/2008 | Harris | |
| 2008/0233773 A1 | 9/2008 | Meleck | |
| 2008/0266888 A1 | 10/2008 | Wayne et al. | |

OTHER PUBLICATIONS

No patent novelty search was performed in this case and neither the Applicant nor the undersigned are aware of any prior art devices or documents which they believe to be material to the invention as claimed. This document is being supplied for informational purposes to the Examiner and is evidence of our desire to comply with the duty of disclosure.

International Search Report and Written Opinion of the International Searching Authority for International Application No. PCT/US2014/012486.

Applicant's Reply to Search Report and Written Opinion of the International Searching Authority for International Application No. PCT/US2014/012486.

* cited by examiner

VEHICLE TO SNOW/ICE CONTROL DEVICE WIRING HARNESS WITH REPLACEABLE CONNECTOR

This application claims priority to U.S. Ser. No. 61/755,271, entitled VEHICLE WIRING HARNESS WITH REPLACEABLE CONNECTOR filed Jan. 22, 2013, which is incorporated herein by reference.

I. BACKGROUND OF THE INVENTION

A. Field of Invention

This invention pertains to the field of wiring harnesses used to connect a vehicle to a snow/ice control device, and more specifically to methods and apparatuses for replacing a worn or damaged wiring harness connector that is used to connect a vehicle to a snow/ice control device supported to the vehicle.

B. Description of the Related Art

It is well known in the art to support a snow/ice control device to a vehicle, such as attaching a snow plow to a truck. When such a snow/ice control device requires an electrical connection between the vehicle and the snow/ice control device, such as to provide power or control from the vehicle to the snow/ice control device, a wiring harness is commonly used. The wiring harness has a first end connected to the appropriate component(s) on the vehicle (such as a battery, a motor, a control device, etc.) and a second end connected to the appropriate component(s) on the snow/ice control device (such as a motor, a hydraulic mechanism, a control device, etc.). It is also known in the art to use a pair of wiring harnesses with a connector positioned between them so that that the snow/ice control device may be easily disconnected from the vehicle (such as to remove the snow/ice control device from the vehicle) and easily reconnected (such as to re-attach the snow/ice control device to the vehicle). This is commonly done, for example, with snow plows that are removed from their vehicles for the summer season and re-attached to their vehicles for the winter season.

Figure 9:
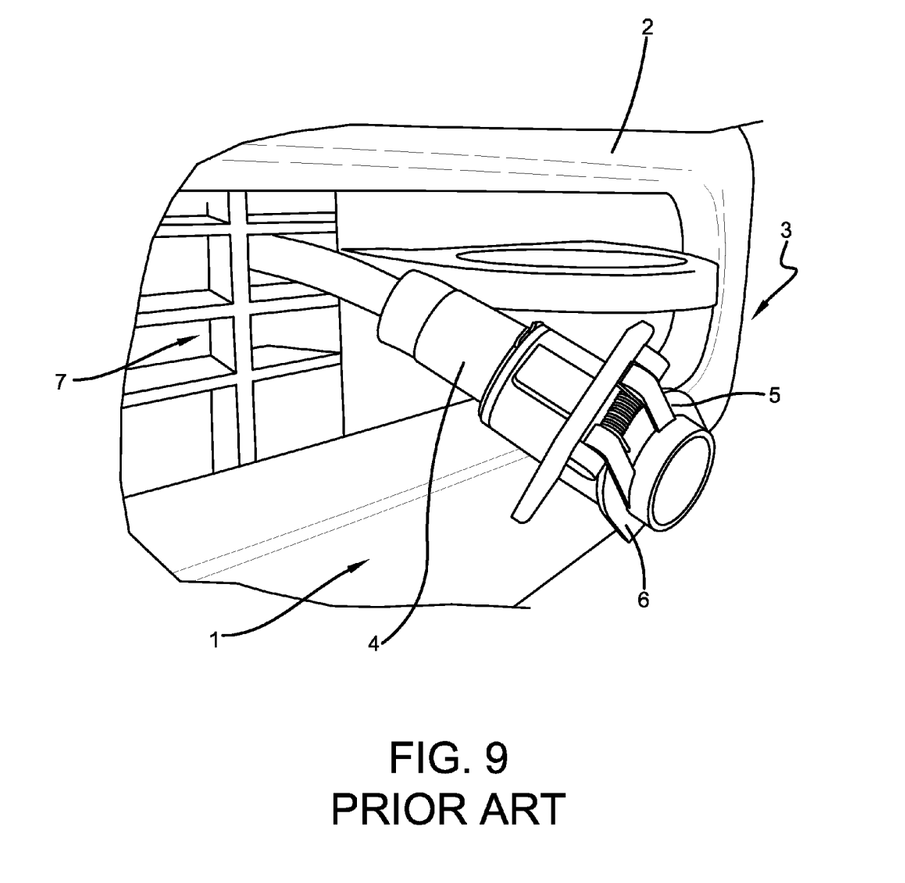
FIG. 9 is a back perspective view of a known wiring harness having a connector that is not replaceable.

FIG. 9, shows a known wiring harness assembly 1 that is connected to a vehicle 2 and that is used to connect the vehicle 2 to a snow plow (not shown). As shown, the wiring harness assembly includes a connector 3. The connector 3 has a first end 4 that is fixedly attached to a wiring harness 7 and a second end 5 that is attachable to another wiring harness (not shown) that is attached to the snow plow. The second end 5 may include a cover 6 that is pivotally attached to the connector 3. The cover 6 protects the end of the wiring harness 7 when the snow plow is not used and is pivoted away from the end of the wiring harness 1 when the other wiring harness is connected to the wiring harness 7.

Wiring harnesses such as shown in FIG. 9 generally work well for their intended purpose. It is known, however, for the connector to become worn or damaged when used. Such damage may be to the connector outer housing or to the electrical conductors inside harness that is connected to the vehicle, including the connector. If the damaged connector is on the wiring harness that is connected to the vehicle, the wiring harness will need to be disconnected from the various connection points inside the vehicle and removed, and a new wiring harness will need to be installed and connected. It is also known to physically cut off the damaged connector from the wiring harness and affix a new connector onto the wiring harness. This requires soldering or otherwise attaching each individual wire of the wiring harness to a respective pin of the connector and then covering or otherwise insulating the connection points. Such a connector may have many wires and connection pins, thus requiring a significant amount of time and labor to reattach each wire to each pin. Also, these new connections may cause problems if they are not properly made.

What is needed, then, is a wiring harness assembly used with a vehicle and a snow/ice control device that has a replaceable connector that may be easily and reliably replaced should the connector become worn or damaged. The present invention addresses this need.

II. SUMMARY

In accordance with one embodiment of this invention, a wiring harness assembly for use with an associated vehicle and an associated snow/ice control device supported to the associated vehicle may comprise: (1) a first wiring harness comprising: a first end that is connectable to the associated vehicle; a second end; and, at least one electric conductor; (2) a second wiring harness comprising: a first end that is connectable to the associated snow/ice control device; a second end; and, at least one electric conductor; (3) at least one second end electric connection component that is accessible from the second end of one of the first wiring harness and the second wiring harness; (4) an intermediate connector comprising: a first end that is fixedly connected to the second end of the other of the first wiring harness and the second wiring harness; a second end; and, at least one second end electric connection component that is accessible from the second end of the intermediate connector; and, (5) a replaceable connector comprising: a first end; a second end; at least one first end electric connection component that is accessible from the first end of the replaceable connector; and, at least one second end electric connection component that is accessible from the second end of the replaceable connector. The first end electric connection component of the replaceable connector may be selectively manually connectable to the second end electric connection component of the intermediate connector and the second end electric connection component of the replaceable connector may be selectively manually connectable to the at least one second end electric connection component that is accessible from the second end of one of the first wiring harness and the second wiring harness to electrically connect the associated vehicle to the associated snow/ice control device. The first end electric connection component of the replaceable connector may be selectively manually dis-connectable from the second end electric connection component of the intermediate connector and the second end electric connection component of the replaceable connector may be selectively manually dis-connectable from the at least one second end electric connection component that is accessible from the second end of one of the first wiring harness and the second wiring harness so that the replaceable connector can be replaced.

In accordance with another embodiment of this invention, a method for use with an associated vehicle and an associated snow/ice control device supported to the associated vehicle may include the steps of: (A) providing a wiring harness assembly comprising: (1) a first wiring harness comprising: a first end; a second end; and, at least one electric conductor; (2) a second wiring harness comprising: a first end; a second end; and, at least one electric conductor; (3) at least one second end electric connection component that is accessible from the second end of one of the first wiring harness and the second wiring harness; (4) an intermediate connector comprising: a first end that is fixedly connected to the second end of the other of the first wiring harness and the second wiring harness; a second end; and, at least one second end electric connection component that is accessible from the second end of the intermediate connector; and, (5) a replaceable connector comprising: a first end; a second end; at least one first end electric connection component that is accessible from the first end of the replaceable connector; and, at least one second end electric connection component that is accessible from the second end of the replaceable connector; (B) connecting the first end of the first wiring harness to the associated vehicle; (C) connecting the first end of the second wiring harness to the associated snow/ice control device; (D) selectively manually connecting the first end electric connection component of the replaceable connector to the second end electric connection component of the intermediate connector; and, (E) selectively manually connecting the second end electric connection component of the replaceable connector to the at least one second end electric connection component that is accessible from the second end of one of the first wiring harness and the second wiring harness. Steps (A) through (E) together may electrically connect the associated vehicle to the associated snow/ice control device. The method may further include the steps of: (G) selectively manually dis-connecting the first end electric connection component of the replaceable connector from the second end electric connection component of the intermediate connector; and, (H) selectively manually dis-connecting the second end electric connection component of the replaceable connector from the at least one second end electric connection component that is accessible from the second end of one of the first wiring harness and the second wiring harness. Steps (G) and (H) may enable the replaceable connector to be replaced.

In accordance with yet another embodiment of this invention, a kit may be used with: (A) an associated vehicle; (B) an associated snow/ice control device supported to the associated vehicle; (C) a first wiring harness comprising: a first end that is connectable to the associated vehicle; a second end; and, at least one electric conductor; (D) a second wiring harness comprising: a first end that is connectable to the associated snow/ice control device; a second end; and, at least one electric conductor; and, (E) a permanent connector that is fixedly connected to the second end of one of the first and second wiring harnesses and selectively manually connectable to a second end electric connection component on the second end of the other of the first and second wiring harnesses. The kit may comprise: (1) an intermediate connector comprising: a first end; a second end; and, at least one second end electric connection component that is accessible from the second end of the intermediate connector; and, (2) a replaceable connector comprising: a first end; a second end; at least one first end electric connection component that is accessible from the first end of the replaceable connector; and, at least one second end electric connection component that is accessible from the second end of the replaceable connector. The first end of the intermediate connecter may be fixedly connectable to the second end of the one of the first and second wiring harnesses after the after the permanent connector is removed. The first end electric connection component of the replaceable connector may be selectively manually connectable to the second end electric connection component of the intermediate connector and the second end electric connection component of the replaceable connector may be selectively manually connectable to the second end electric connection component on the second end of the other of the first and second wiring harnesses to electrically connect the associated vehicle to the associated snow/ice control device. The first end electric connection component of the replaceable connector may be selectively manually dis-connectable from the second end electric connection component of the intermediate connector and the second end electric connection component of the replaceable connector may be selectively manually dis-connectable from the second end electric connection component on the second end of the other of the first and second wiring harnesses so that the replaceable connector can be replaced.

Numerous benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
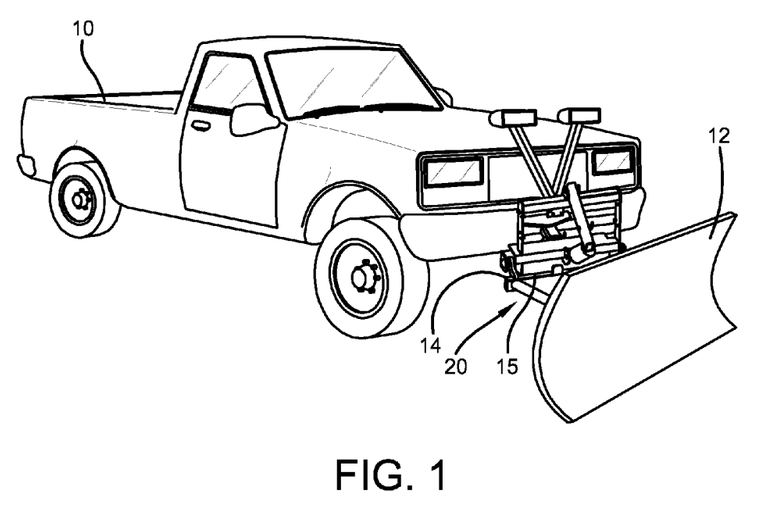
FIG. 1 is a perspective view of a pickup truck to which a plow is supported and which includes a replaceable connector according to some embodiments of this invention.

Referring now to the drawings wherein the showings are for purposes of illustrating embodiments of the invention only and not for purposes of limiting the same, and wherein like reference numerals are understood to refer to like components, FIG. 1 shows a vehicle 10 equipped with a snow/ice control device 12, a snow plow 12, according to some embodiments of this invention. While the snow/ice control device 12 shown is a snow plow, it should be understood that this invention may work with other types of snow/ice control devices, such as but not limited to salt spreads and deicers, chosen with the sound judgment of a person of skill in the art. While the vehicle 10 shown is a pick-up truck, it should be understood that this invention will work with any type of vehicle chosen with the sound judgment of a person of skill in the art and may have non-vehicle applications as well.

With continuing reference to FIG. 1, a pair of wiring harnesses 14, 15 may be used to connect the electrical circuitry of the snow/ice control device 12 to the electrical circuitry of the vehicle 10. The wiring harness 14 may be connected to the vehicle 10 (that is, the desired electrical component(s) on the vehicle) and the wiring harness 15 may be connected to the snow/ice control device 12 (that is, the desired electrical component(s) on the snow/ice control device). A replaceable connector 20 may be used between the wiring harnesses 14, 15, so that it is easy to connect the wiring harnesses 14, 15 to each other (and thus electrically connect the device 12 to the vehicle 10) and to disconnect the wiring harnesses 14, 15 from each other (and thus electrically disconnect the device 12 from the vehicle 10). For the embodiments shown, the replaceable connector 20 is designed to remain primarily with the wiring harness 14 that is connected to the vehicle 10. In other embodiments, however, the replaceable connector 20 may be designed to remain primarily with the wiring harness 15 that is connected to the snow/ice control device 12. The portion of wiring harness 14 that is connected to the vehicle 10 may be installed and routed under the hood of the vehicle 10 in a known manner in one embodiment.

Figure 2:
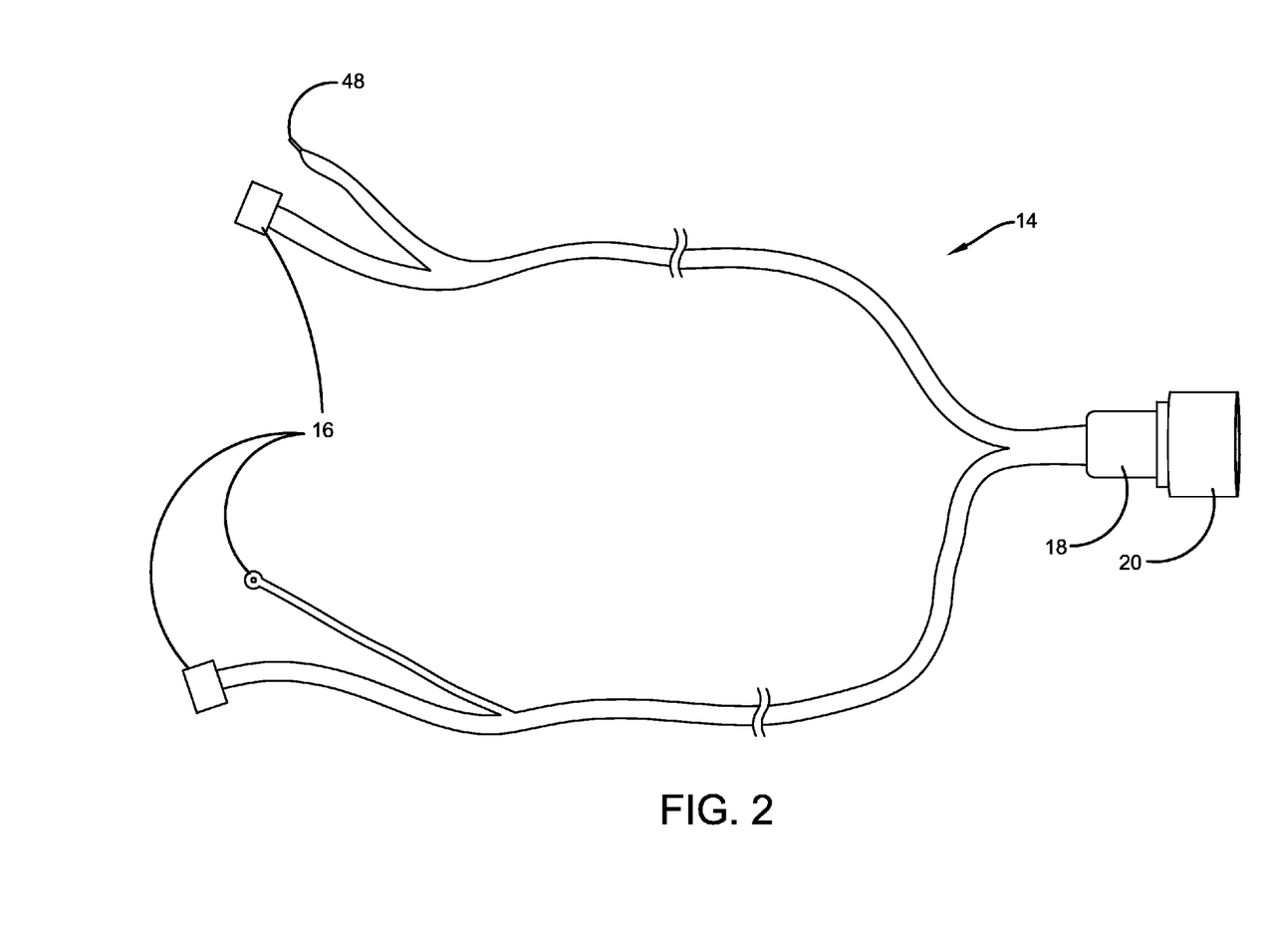
FIG. 2 is a schematic representation of a top view of a wiring harness.

FIG. 2 illustrates the wiring harness 14. In one embodiment, shown, the harness 14 may be connected to one connector 20. In another embodiment, multiple connectors 20 may be used. The wiring harness 14 may contain at least one electrical conductor or wire 48. Multiple conductors 48 may be routed together with an outer sleeve or tubing holding these conductors 48 together. These conductors 48 can branch out to the appropriate portions of the electrical components of the vehicle 10. At least one connecting component 16 may be used to connect the individual conductors 48 to the respective electrical circuit inside the vehicle 10. Such connecting components 16 can connect a single conductor 48 or multiple conductors 48.

Figure 3:
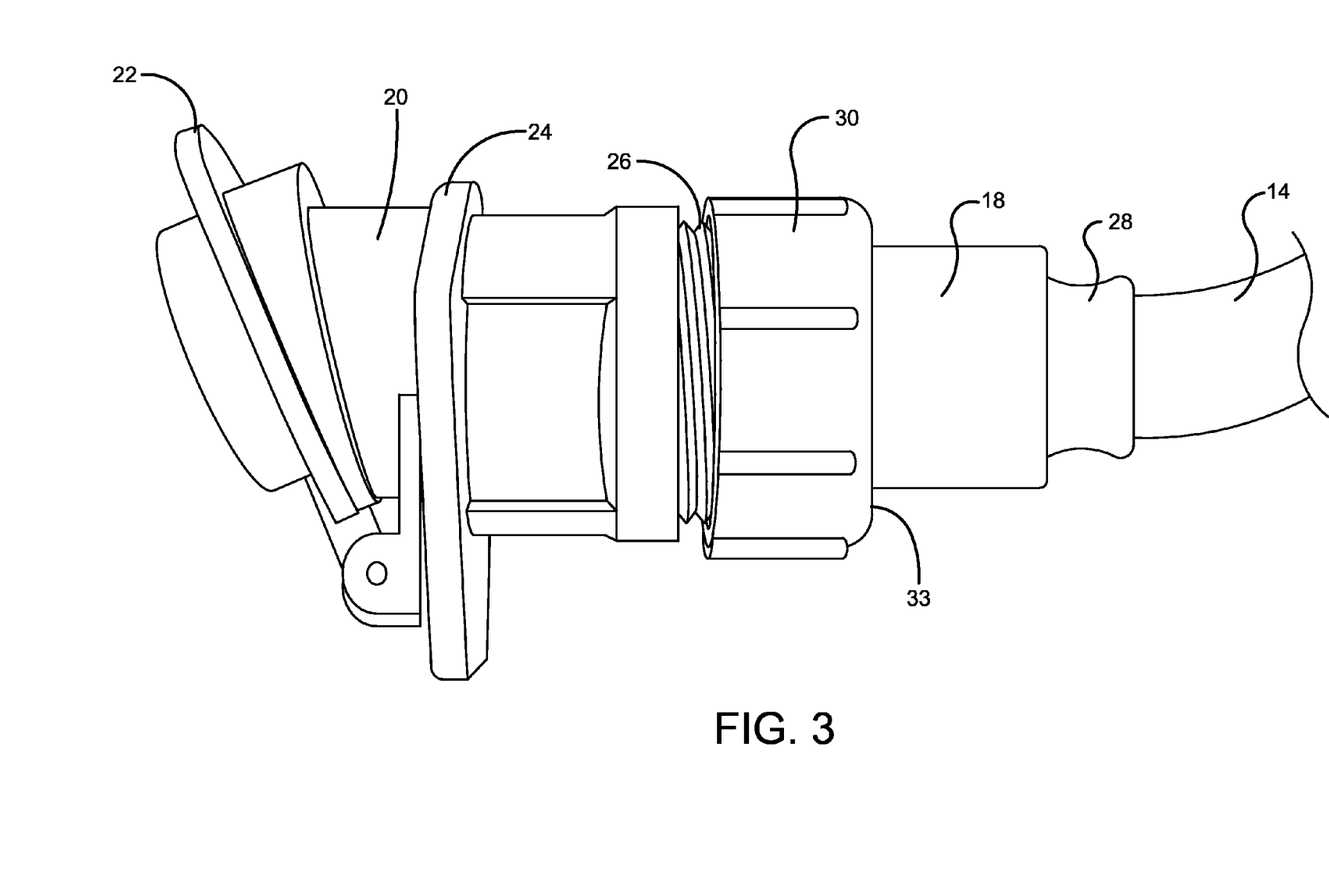
FIG. 3 is a side view of a replaceable connector connected to a wiring harness.

FIG. 3 shows the end of the wiring harness 14 connected to the replaceable connector 20. As will be discussed further below, the replaceable connector 20 may be easily replaced, if necessary. The wiring harness 14 may be connected to an intermediate connector 18. The harness 14 may be covered at the location where the harness 14 is connected to the intermediate connector 18 by electrical tape 28, shrink wrap 28, or any suitable insulator 28.

With reference now to FIGS. 3-5A, the intermediate connector 18 may be attached to the replaceable connector 20. In an alternative embodiment of the invention, the replaceable connector 20 may include a housing having a threaded portion 26. A securing ring 30, which may have a threaded portion 31 on the inside, may be positioned over the intermediate connector 18 and screwed onto the replaceable connector 20 at the threaded portion 26 to secure the intermediate connector 18 inside the replaceable connector 20. This ring 30 can have its inner diameter narrower at the rear portion 33, which faces the wiring harness 14, than at the front portion, which faces the replaceable connector 20. The replaceable connector 20 can include a mounting bracket 24, which may be integral with the replaceable connector 20 in one embodiment of the invention. The mounting bracket 24 may be used to mount the replaceable connector to the vehicle or to the snow/ice control device. In an alternative embodiment of the invention, the replaceable connector 20 can include a cover 22 that covers the front end of the replaceable connector 20. Such a cover 22 may be used to protect the inside of the replaceable connector 20 from dirt and also to protect the pins inside the replaceable connector 20 from damage.

Figure 4:
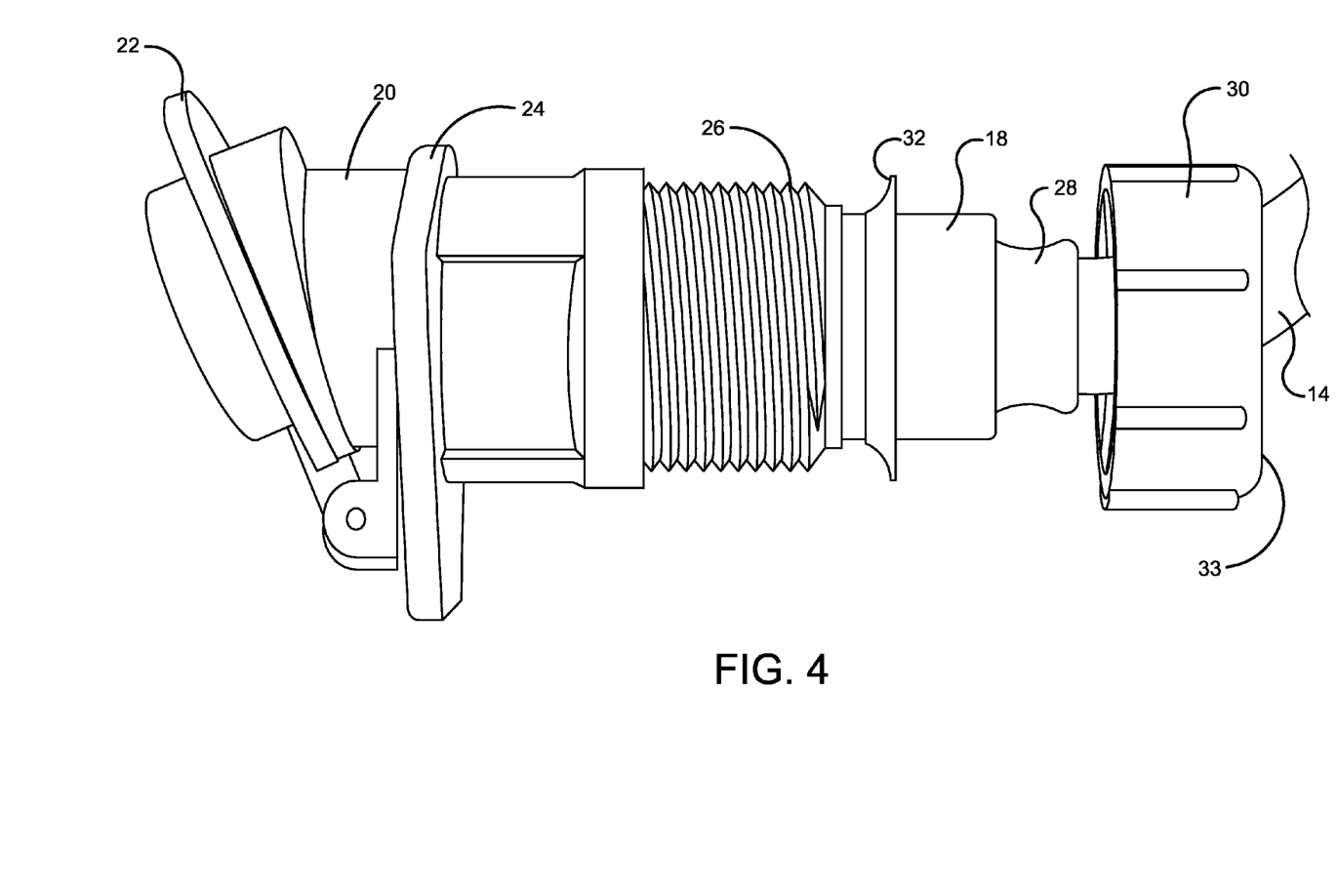
FIG. 4 is a view similar to that shown in FIG. 3 but showing the securing ring disconnected.

FIG. 4 is similar to FIG. 3, but it shows the ring 30 unscrewed from the threaded portion 26 of the replaceable connector 20 and removed from the replaceable connector 20. A sealing ring 32, shown in FIGS. 5 and 5A, may be installed, in an alternative embodiment of the invention, on top of the intermediate connector 18. The outer diameter of this sealing ring 32 may be smaller at its front end, which faces the replaceable connector 20, than at its rear end, which faces the intermediate connector 18. When the sealing ring 32 is installed on top of the intermediate connector 18 and this intermediate connector 18 is attached to the replaceable connector 20, the sealing ring 32 may be wedged into the space between the connectors 18, 20. When the securing threaded ring 30 is screwed onto the threaded portion 26 of the replaceable connector 20, the narrower inner diameter of the rear of the securing threaded ring 30 pushes the wider outer diameter of the rear of the sealing ring 32, which causes the sealing ring 32 to wedge itself further into the space between the connectors 18, 20, which seals the gap between the connectors 18, 20 and causes an interference fit between the connectors 18, 20, sealing ring 32, and securing threaded ring 30 that holds these components secured together.

Figure 5:
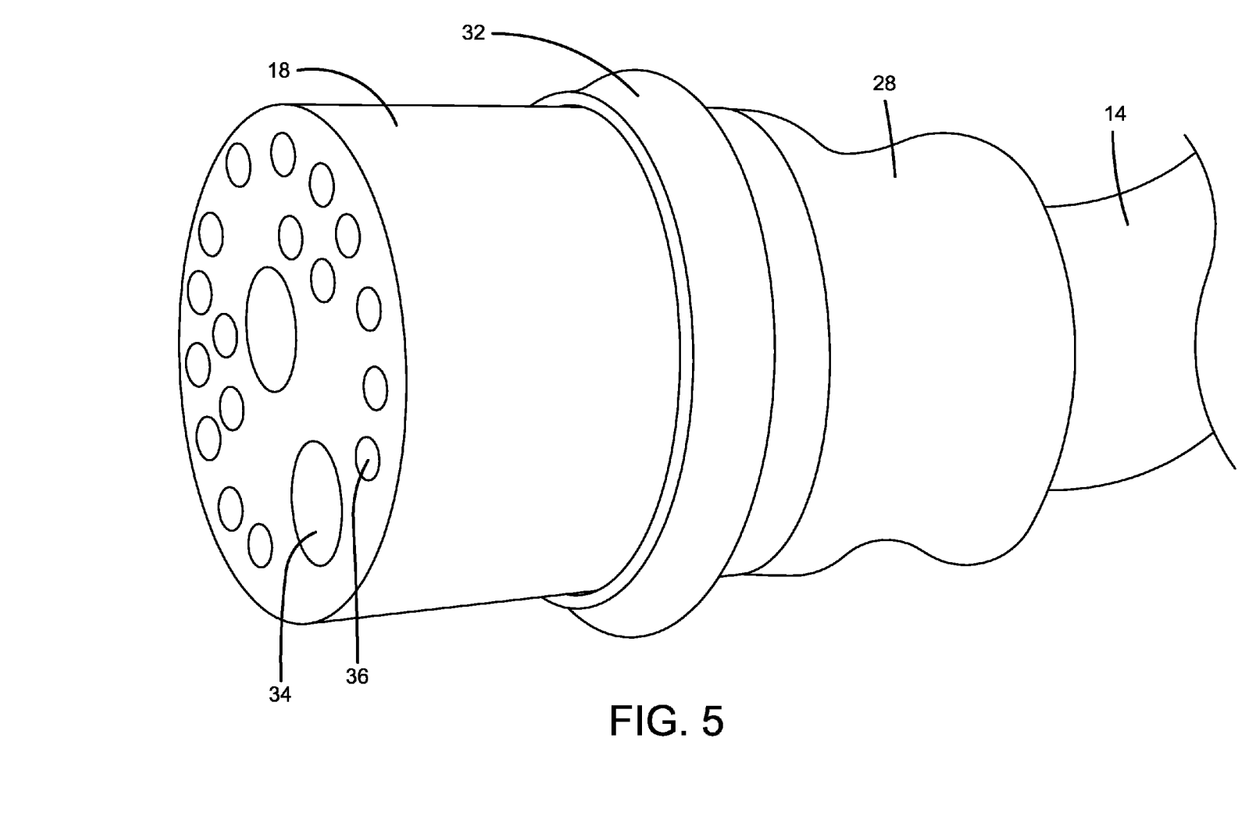
FIG. 5 is a perspective side view of an intermediate connector attached to a wiring harness.
Figure 5A:
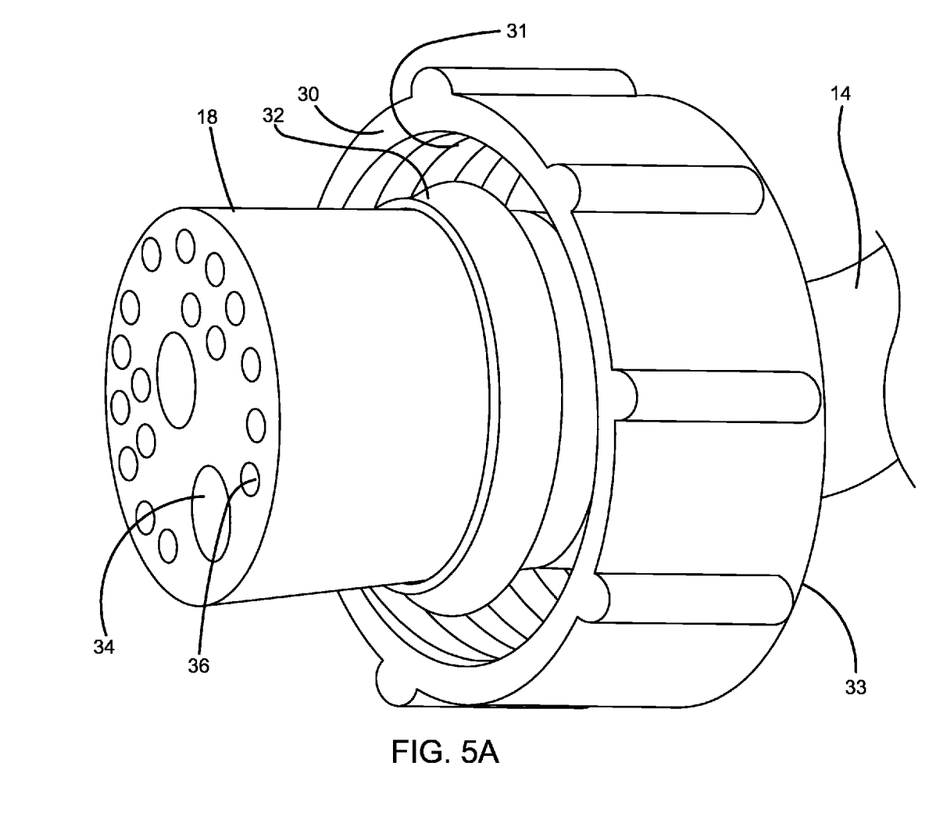
FIG. 5A is a perspective side view of an intermediate connector showing a securing ring and a sealing ring.

FIG. 5 shows the intermediate connector 18 connected to the wiring harness 14 but disconnected from the replaceable connector 20. The individual conductors 48 of the harness 14 may be secured to terminals inside the connector 18 by any suitable means chosen with the sound judgment of one of ordinary skill in the art, including, but not limited to, soldering, pressure-fit termination, or screw-type termination.

Figure 7:
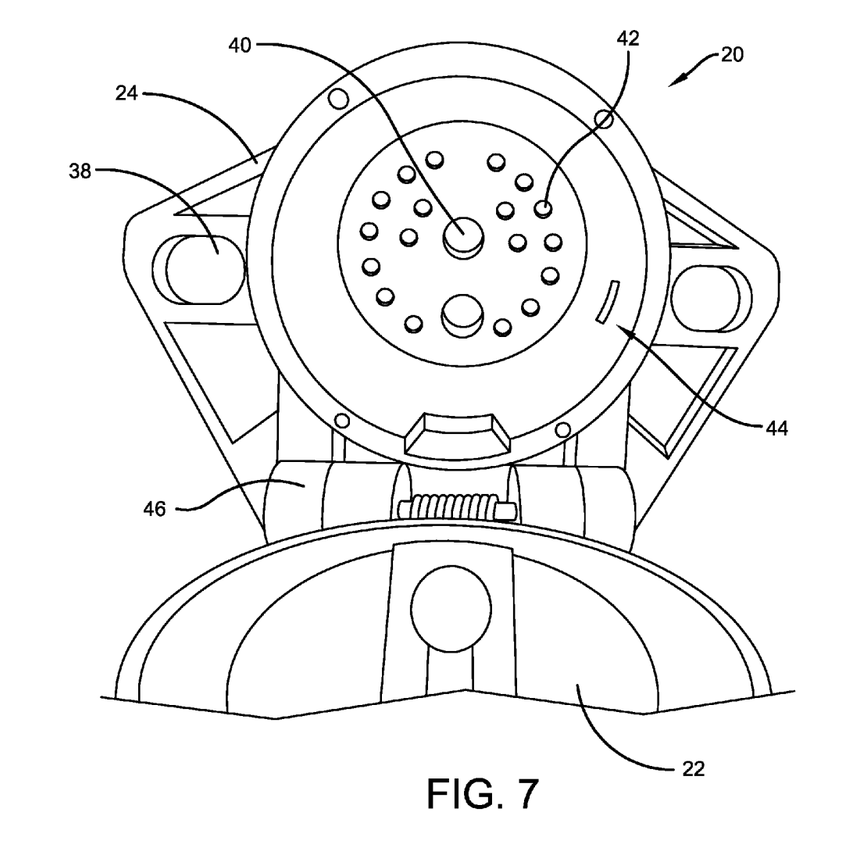
FIG. 7 is a front view of a replaceable connector with the cover open.
Figure 8:
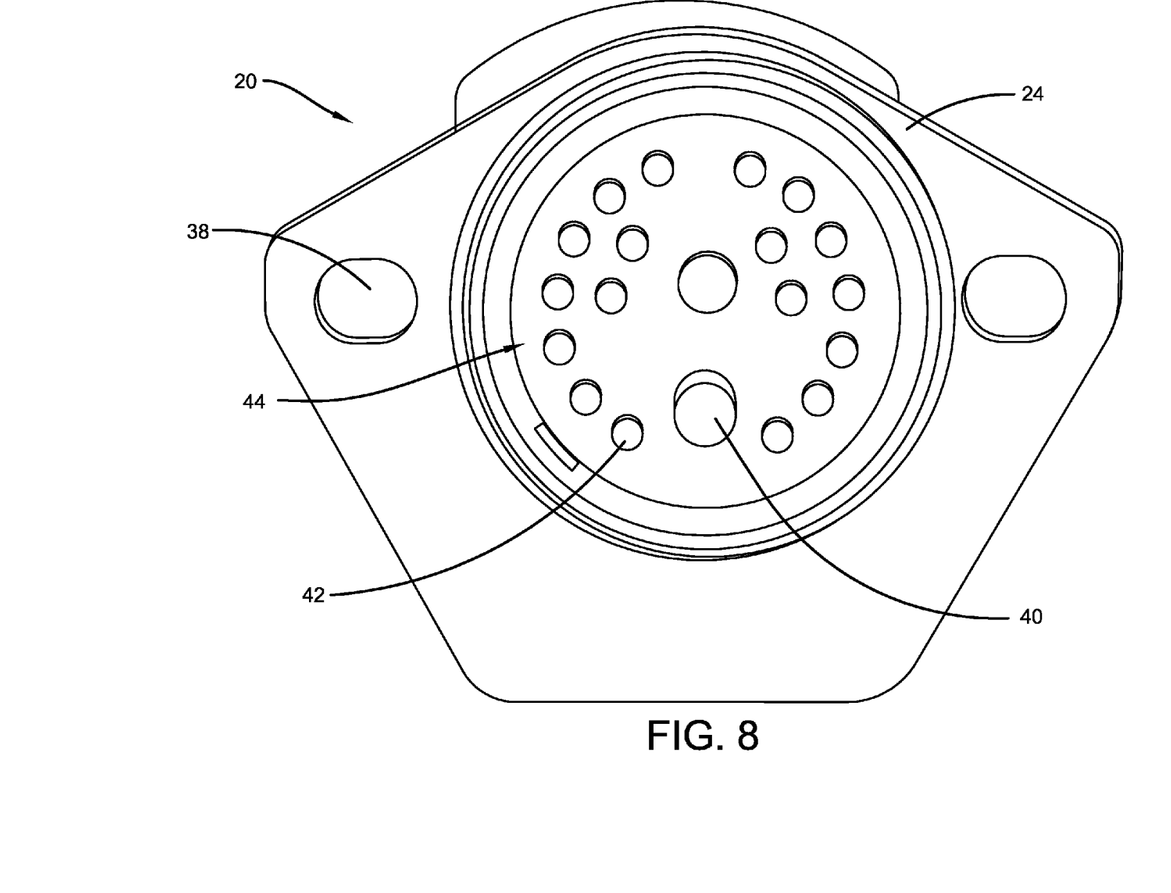
FIG. 8 is a rear view of a replaceable connector.

With reference now to FIGS. 5 and 7-8, in alternative embodiments of the invention, the intermediate connector 18 may include electric connection components such as large-pin electric sockets 34, which are suitable for insertion of large pins 40 (illustrated in FIGS. 7 and 8), and small-pin electric sockets 36, which are suitable for insertion of small pins 42 (also illustrated in FIGS. 7 and 8). In this way the replaceable connector 20 may be "plugged into" the intermediate connector 18. Any number, combination, shape, and configuration of such electric connection components 34, 36 may be made in alternative embodiments of the invention. Such electric connection components 34, 36 may be matched to correspond to the opposite polarity of electric connection components 40, 42 inside the replaceable connector 20. For example, a female electric connection component (socket) 34, 36 on the intermediate connector 18 can correspond to a male electric connection component (pin) 40, 42 on the replaceable connector 20; a male electric connection component (pin) 34, 36 on the intermediate connector 18 can correspond to a female electric connection component (socket) 40, 42 on the replaceable connector 20. The replaceable connector 20 can include both male and female electric connection component 40, 42 that correspond to opposite-polarity female and male electric connection component 34, 36 on the intermediate connector 18. A relatively large electric connection component 34 on the intermediate connector 18 can correspond to and engage a relatively large electric connection component 40 on the replaceable connector 20; a relatively small electric connection component 36 on the intermediate connector 18 can correspond to and engage a relatively small electric connection component 42 on the replaceable connector 20. The relative size designations (e.g., "large" and "small") can refer, in alternative embodiments, to a measurement in any or all of the three dimensions (e.g., length, width, or height) of such electric connection components 34, 36, 40, 42. Such electric connection components 34, 36, 40, 42 are not limited to just two sizes—large or small. Such electric connection components 34, 36, 40, 42 may be any shape, including, but not limited to, round, oval, rectangular, or triangular. The configuration of such electric connection components 34, 36, 40, 42 may be arranged to "key" the connectors 18, 20 such that the intermediate connector 18 can only be inserted into the replaceable connector 20 in only one way, which would help prevent erroneous connections. An alternative embodiment may "key" the connectors 18, 20 by molding the shape of the housing of both connectors 18, 20 such that the intermediate connector 18 can only be inserted into the replaceable connector 20 in one way.

Figure 6:
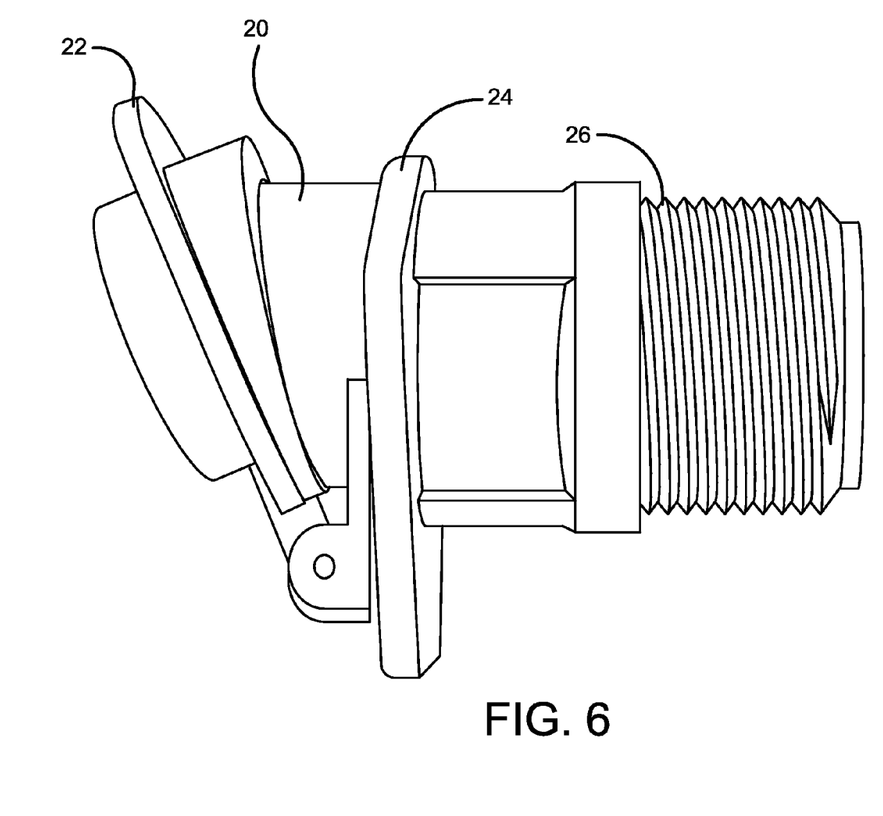
FIG. 6 is a side view of a replaceable connector.

FIG. 6 shows a side view of the replaceable connector 20 when it is removed from the wiring harness 14 and intermediate connector 18. FIG. 7 shows a front view of the replaceable connector 20. The mounting bracket 24 can include mounting holes 38 through which a screw or bolt may be passed to secure the replaceable connector 20 to an associated structure, such as to the vehicle or the snow/ice removal device. The replaceable connector 20 can include relatively large pins 40, which are suitable for insertion into large-pin sockets, and relatively small pins 42, which are suitable for insertion into small-pin sockets, analogous to the description of the intermediate connector 18 above. These electric connection components 40, 42 may be housed inside a cavity 44 of the replaceable connector 20. An electric connection component from the device 12, and/or a wiring harness connected to the device 12, may be plugged into this cavity to electrically connect the vehicle's 10 electrical system to the electrical system of the device 12.

The cover 22 may be secured to the replaceable connector 20 by any means chosen with the sound judgment of one of ordinary skill in the art, including, but not limited to, at least one hinge 46 or flexible polymeric, rubber, or cloth material 46 that allows the cover 22 to pivot to a closed position (where it covers the replaceable connector 20) and to pivot to an open position (where it uncovers the replaceable connector 20). The cover 22 may be biased toward the closed position by any suitable means, including, but not limited to, a spring or a latch. In an alternative embodiment, the cover 22 can include a gasket mounted on the inside surface of the cover 22 opposite the cavity 44, to improve the seal between the cover 22 and connector 20.

FIG. 8 illustrates a rear view of the replaceable connector 20. The replaceable connector 20 can also include relatively large pins 40, which are suitable for insertion (or plugging) into relatively large-pin sockets 34, and relatively small pins 42, which are suitable for insertion into relatively small-pin sockets 36, as described with respect to the intermediate connector 18. These electric connection components 40, 42 may be housed inside a cavity 44 of the replaceable connector 20. The intermediate connector 18 may be plugged into this cavity 44. The cavity 44 can provide additional protection to the electric connectors 34, 36 or the intermediate connector 18.

The replaceable connector 20 and the intermediate connector 18 may be made from metal or a polymeric material. The sealing ring 32 may be made from a polymeric material. The connectors 20, 18 may be molded or formed into any desired shape or configuration.

In cases where the replaceable connector 20 is worn or damaged but the corresponding wiring harness 14 remains in good shape, an operator can unscrew the securing threaded ring 30, unplug the replaceable connector 20 from the intermediate connector 18, obtain a new connector 20, plug the intermediate connector 18 into the new connector 20, and screw the ring 30 back onto the new connector 20. The operator does not need to remove the entire wiring harness 14 from the vehicle 10 when only the replaceable connector 20 is damaged. Nor does the operator need to cut off the replaceable connector 20 and resolder each individual conductor 48 of the wiring harness 14 onto a new connector 20.

An alternative embodiment of the invention includes a kit for replacing a permanent connector of a wiring harness 14 with a connector 20 that may be easily and quickly replaced when damaged. Such a kit may include a connector 20, which includes a securing threaded ring 30 and a sealing ring 32, and an intermediate connector 18. Such a kit may be installed onto a wiring harness 14 with a permanent connector by cutting off the permanent connector from the wiring harness 14; connecting individual conductors 48 of the wiring harness 14 to the terminals of the intermediate connector 18; plugging the intermediate connector 18 into the replaceable connector 20 with an intervening sealing ring 32; and screwing the securing threaded ring 30 onto the replaceable connector 20.

It should be noted that many of the connections and disconnections made with this invention can be selectively manually made. By "selectively" it is meant whenever the operator decides to make the connection or disconnection. By "manually" it is meant that the connection or disconnection can be made by a single typical man without use of any tools—the operator's "bare hands" are sufficient. This greatly simplifies the use of this invention. Of course tools may be used, if desirable. Note specifically that the connections and disconnections of the replaceable connector 20—both ends—can be selectively manually made and that the connections and disconnections of the end of the intermediate connector 18 that is not fixed to the wiring harness can also be selectively manually made. Other connections and disconnections including the wiring harnesses may be selectively manually made when designed to do so.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A wiring harness assembly for use with an associated vehicle and an associated snow/ice control device supported to the associated vehicle, the wiring harness assembly comprising:
   a first wiring harness comprising: a first end that is connectable to the associated vehicle; a second end; and, at least one electric conductor;
   a second wiring harness comprising: a first end that is connectable to the associated snow/ice control device; a second end; and, at least one electric conductor;
   at least one second end electric connection component that is accessible from the second end of one of the first wiring harness and the second wiring harness;
   an intermediate connector comprising: a first end that is fixedly connected to the second end of the other of the first wiring harness and the second wiring harness; a second end; and, at least one second end electric connection component that is accessible from the second end of the intermediate connector;
   a replaceable connector comprising: a first end; a second end; at least one first end electric connection component that is accessible from the first end of the replaceable connector; and, at least one second end electric connection component that is accessible from the second end of the replaceable connector;
   wherein the first end electric connection component of the replaceable connector is selectively manually connectable to the second end electric connection component of the intermediate connector and the second end electric connection component of the replaceable connector is selectively manually connectable to the at least one second end electric connection component that is accessible from the second end of one of the first wiring harness and the second wiring harness to electrically connect the associated vehicle to the associated snow/ice control device; and,
   wherein the first end electric connection component of the replaceable connector is selectively manually dis-connectable from the second end electric connection component of the intermediate connector and the second end electric connection component of the replaceable connector is selectively manually dis-connectable from the at least one second end electric connection component that is accessible from the second end of one of the first wiring harness and the second wiring harness so that the replaceable connector can be replaced.

2. The wiring harness assembly of claim 1 wherein the at least one second end electric connection component is accessible from the second end of the first wiring harness.

3. The wiring harness assembly of claim 2 wherein the associated snow/ice control device is an associated snow plow.

4. The wiring harness assembly of claim 1 further comprising:
a securing ring that has a threaded portion and that is positionable over the intermediate connector;
wherein the replaceable connector comprises a housing having a threaded portion; and,
wherein the threaded portion of the securing ring is selectively manually engagable to the threaded portion of the replaceable connector to secure the intermediate connector to the replaceable connector.

5. The wiring harness assembly of claim 1 wherein:
the at least one second end electric connection component that is accessible from the second end of the intermediate connector comprises at least one relatively small electric socket and at least one relatively large electric socket;
the first end electric connection component of the replaceable connector comprises at least one relatively small pin that is received within the at least one relatively small electric socket in the second end of the intermediate connector and at least one relatively large pin that is received within the at least one relatively large electric socket in the second end of the intermediate connector;
the at least one second end electric connection component that is accessible from the second end of one of the first wiring harness and the second wiring harness comprises at least one relatively small electric socket and at least one relatively large electric socket; and,
the second end electric connection component of the replaceable connector comprises at least one relatively small pin that is received within the at least one relatively small electric socket in the at least one second end electric connection component that is accessible from the second end of one of the first wiring harness and the second wiring harness and at least one relatively large pin that is received within the at least one relatively large electric socket in the at least one second end electric connection component that is accessible from the second end of one of the first wiring harness and the second wiring harness.

6. The wiring harness assembly of claim 1 wherein:
the first end electric connection component of the replaceable connector is housed inside a first cavity formed on the first end of the replaceable connector and the second end electric connection component of the replaceable connector is housed inside a second cavity formed on the second end of the replaceable connector.

7. The wiring harness assembly of claim 4 further comprising:
a sealing ring that is wedged between the intermediate connector and the replaceable connector when the threaded portion of the securing ring is selectively manually engaged to the threaded portion of the replaceable connector to secure the intermediate connector to the replaceable connector.

8. A method for use with an associated vehicle and an associated snow/ice control device supported to the associated vehicle, the method comprising the steps of:
(A) providing a wiring harness assembly comprising: (1) a first wiring harness comprising: a first end; a second end; and, at least one electric conductor; (2) a second wiring harness comprising: a first end; a second end; and, at least one electric conductor; (3) at least one second end electric connection component that is accessible from the second end of one of the first wiring harness and the second wiring harness; (4) an intermediate connector comprising: a first end that is fixedly connected to the second end of the other of the first wiring harness and the second wiring harness; a second end; and, at least one second end electric connection component that is accessible from the second end of the intermediate connector; and, (5) a replaceable connector comprising: a first end; a second end; at least one first end electric connection component that is accessible from the first end of the replaceable connector; and, at least one second end electric connection component that is accessible from the second end of the replaceable connector;
(B) connecting the first end of the first wiring harness to the associated vehicle;
(C) connecting the first end of the second wiring harness to the associated snow/ice control device;
(D) selectively manually connecting the first end electric connection component of the replaceable connector to the second end electric connection component of the intermediate connector;
(E) selectively manually connecting the second end electric connection component of the replaceable connector to the at least one second end electric connection component that is accessible from the second end of one of the first wiring harness and the second wiring harness;
(F) wherein steps (A) through (E) together electrically connect the associated vehicle to the associated snow/ice control device;
(G) selectively manually dis-connecting the first end electric connection component of the replaceable connector from the second end electric connection component of the intermediate connector;
(H) selectively manually dis-connecting the second end electric connection component of the replaceable connector from the at least one second end electric connection component that is accessible from the second end of one of the first wiring harness and the second wiring harness; and,
(I) wherein steps (G) and (H) enable the replaceable connector to be replaced.

9. The method of claim 8 wherein:
the associated snow/ice control device is an associated snow plow; and,
step (A) comprises the step of: providing the at least one second end electric connection component to be accessible from the second end of the first wiring harness.

10. The method of claim 8 wherein:
step (A) comprises the steps of: providing the replaceable connector with a threaded portion; and, providing a securing ring that has a threaded portion that is positionable over the intermediate connector;
after step (D) the method comprises the step of: selectively manually engaging the threaded portion of the securing ring with the threaded portion of the replaceable connector to secure the intermediate connector to the replaceable connector; and, before step (G) the method comprises the step of: selectively manually disengaging the threaded portion of the securing ring from the threaded portion of the replaceable connector.

11. The method of claim 8 wherein:
step (A) comprises the steps of: providing one of the second end electric connection component of the intermediate connector and the first end electric connection component of the replaceable connector with at least two electric sockets; and, providing the other of the second end electric connection component of the intermediate connector and the first end electric connection component of the replaceable connector with at least two pins;
step (D) comprises the step of: inserting the pins within the sockets; and,
step (G) comprises the step of: removing the pins from the sockets.

12. The method of claim 8 wherein:
step (A) comprises the step of: providing one of the second end of the intermediate connector and the first end of the replaceable connector with a cavity;
step (D) comprises the step of: inserting the other of the second end of the intermediate connector and the first end of the replaceable connector into the cavity; and,
step (G) comprises the step of: removing the other of the second end of the intermediate connector and the first end of the replaceable connector from the cavity.

13. The method of claim 8 wherein:
step (A) comprises the step of: providing the replaceable connector with a mounting bracket;
prior to using the associated snow/ice control device the method comprises the step of: using the mounting bracket to mount the replaceable connector to one of the associated vehicle and the associated snow/ice control device.

14. A kit for use with: (A) an associated vehicle; (B) an associated snow/ice control device supported to the associated vehicle; (C) a first wiring harness comprising: a first end that is connectable to the associated vehicle; a second end; and, at least one electric conductor; (D) a second wiring harness comprising: a first end that is connectable to the associated snow/ice control device; a second end; and, at least one electric conductor; and, (E) a permanent connector that is fixedly connected to the second end of one of the first and second wiring harnesses and selectively manually connectable to a second end electric connection component on the second end of the other of the first and second wiring harnesses; wherein the kit comprises:
an intermediate connector comprising: a first end; a second end; and, at least one second end electric connection component that is accessible from the second end of the intermediate connector; and,
a replaceable connector comprising: a first end; a second end; at least one first end electric connection component that is accessible from the first end of the replaceable connector; and, at least one second end electric connection component that is accessible from the second end of the replaceable connector;
wherein the first end of the intermediate connecter is fixedly connectable to the second end of the one of the first and second wiring harnesses after the after the permanent connector is removed;
wherein the first end electric connection component of the replaceable connector is selectively manually connectable to the second end electric connection component of the intermediate connector and the second end electric connection component of the replaceable connector is selectively manually connectable to the second end electric connection component on the second end of the other of the first and second wiring harnesses to electrically connect the associated vehicle to the associated snow/ice control device; and,
wherein the first end electric connection component of the replaceable connector is selectively manually dis-connectable from the second end electric connection component of the intermediate connector and the second end electric connection component of the replaceable connector is selectively manually dis-connectable from the second end electric connection component on the second end of the other of the first and second wiring harnesses so that the replaceable connector can be replaced.

15. The kit of claim 14 wherein the at least one second end electric connection component is accessible from the second end of the first wiring harness.

16. The kit of claim 14 wherein the associated snow/ice control device is an associated snow plow.

17. The kit of claim 14 further comprising:
a securing ring that has a threaded portion and that is positionable over the intermediate connector;
wherein the replaceable connector comprises a housing having a threaded portion; and,
wherein the threaded portion of the securing ring is selectively manually engagable to the threaded portion of the replaceable connector to secure the intermediate connector to the replaceable connector.

18. The kit of claim 14 wherein:
the at least one second end electric connection component that is accessible from the second end of the intermediate connector comprises at least one relatively small electric socket and at least one relatively large electric socket;
the first end electric connection component of the replaceable connector comprises at least one relatively small pin that is received within the at least one relatively small electric socket in the second end of the intermediate connector and at least one relatively large pin that is received within the at least one relatively large electric socket in the second end of the intermediate connector;
the at least one second end electric connection component that is accessible from the second end of one of the first wiring harness and the second wiring harness comprises at least one relatively small electric socket and at least one relatively large electric socket; and,
the second end electric connection component of the replaceable connector comprises at least one relatively small pin that is received within the at least one relatively small electric socket in the at least one second end electric connection component that is accessible from the second end of one of the first wiring harness and the second wiring harness and at least one relatively large pin that is received within the at least one relatively large electric socket in the at least one second end electric connection component that is accessible from the second end of one of the first wiring harness and the second wiring harness.

19. The kit of claim 14 wherein:
the first end electric connection component of the replaceable connector is housed inside a first cavity formed on the first end of the replaceable connector and the second end electric connection component of the replaceable connector is housed inside a second cavity formed on the second end of the replaceable connector.

20. The kit of claim 17 further comprising:

a sealing ring that is wedged between the intermediate connector and the replaceable connector when the threaded portion of the securing ring is selectively manually engaged to the threaded portion of the replaceable connector to secure the intermediate connector to the replaceable connector.

\* \* \* \* \*